(12) United States Patent
Derelöv

(10) Patent No.: US 9,723,923 B2
(45) Date of Patent: *Aug. 8, 2017

(54) PANEL WITH A SLIDER

(71) Applicant: Valinge Innovation AB, Viken (SE)

(72) Inventor: Peter Derelöv, Helsingborg (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,403

(22) Filed: Jun. 2, 2016

(65) Prior Publication Data

US 2016/0270531 A1 Sep. 22, 2016

Related U.S. Application Data

(63) Continuation of application No. 14/794,883, filed on Jul. 9, 2015, now Pat. No. 9,375,085.

(30) Foreign Application Priority Data

Jul. 11, 2014 (SE) .................................... 1450891-5

(51) Int. Cl.
*A47B 95/00* (2006.01)
*A47B 88/04* (2006.01)
(Continued)

(52) U.S. Cl.
CPC .......... *A47B 88/044* (2013.01); *A47B 88/402* (2017.01); *A47B 88/43* (2017.01);
(Continued)

(58) Field of Classification Search
CPC .................................................. A47B 88/047
(Continued)

(56) References Cited

U.S. PATENT DOCUMENTS

| 291,032 A | 1/1884 | Cleland |
|---|---|---|
| 634,581 A | 10/1899 | Miller |

(Continued)

FOREIGN PATENT DOCUMENTS

| CN | 203424576 U | 2/2014 |
|---|---|---|
| DE | 20 2009 008 825 U1 | 10/2009 |

(Continued)

OTHER PUBLICATIONS

International Search Report/Written Opinion mailed Nov. 5, 2015 in PCT/SE2015/050810, ISA/SE, Patent-och registreringsverket, Stockholm, SE, 8 pages.

(Continued)

*Primary Examiner* — Matthew Ing
(74) *Attorney, Agent, or Firm* — Buchanan Ingersoll & Rooney P.C.

(57) ABSTRACT

A panel provided with a slider. The slider including a first surface and the panel including a second surface, the slider is being configured to be assembled to the panel with the first surface facing the second surface. The second surface is provided with an insertion groove and a displacement groove, which are of a longitudinal shape. A first angle, which is between the second surface and the insertion groove, is an acute angle. A strip protrudes from the first surface. A second angle, which is between the strip and the first surface, is an acute angle. The strip is configured to be inserted into the insertion groove when the slider is assembled to the panel. A displaceable tongue is arranged in the displacement groove. A locking surface of the displaceable tongue is configured to cooperate with a locking surface of the strip for locking the strip to the panel.

13 Claims, 9 Drawing Sheets

(51) Int. Cl.
*F16B 5/12* (2006.01)
*F16B 12/10* (2006.01)
*A47B 88/931* (2017.01)
*A47B 88/43* (2017.01)
*A47B 88/40* (2017.01)
*A47B 88/938* (2017.01)
*A47B 88/423* (2017.01)

(52) U.S. Cl.
CPC ............ *A47B 88/931* (2017.01); *F16B 5/126* (2013.01); *F16B 12/10* (2013.01); *A47B 88/938* (2017.01); *A47B 2088/4235* (2017.01)

(58) Field of Classification Search
USPC ................ 312/334.4, 334.6, 334.14, 334.27; 248/222.11, 220.31
See application file for complete search history.

(56) References Cited

U.S. PATENT DOCUMENTS

| | | | |
|---|---|---|---|
| 701,000 A * | 5/1902 | Ahrens | A47B 88/044 211/134 |
| 861,911 A | 7/1907 | Stewart | |
| 881,673 A | 3/1908 | Ellison | |
| 1,534,468 A | 4/1925 | Shea, Jr. | |
| 1,954,242 A | 4/1934 | Heppenstall | |
| 2,360,451 A | 10/1944 | Stone | |
| 2,362,904 A | 11/1944 | Kramer | |
| 2,496,184 A | 1/1950 | Von Canon | |
| 3,195,968 A | 7/1965 | Freeman | |
| 3,284,152 A | 11/1966 | Schörghuber | |
| 3,347,610 A | 10/1967 | Pilliod | |
| 3,410,441 A | 11/1968 | Rhyne | |
| 3,722,704 A | 3/1973 | Piretti | |
| 3,784,271 A | 1/1974 | Schreiber | |
| 3,885,845 A | 5/1975 | Krieks | |
| 4,089,614 A | 5/1978 | Harley | |
| 4,099,887 A | 7/1978 | Mackenroth | |
| 4,116,510 A | 9/1978 | Franco | |
| 4,279,397 A * | 7/1981 | Larsson | A47B 95/008 108/152 |
| 4,509,648 A * | 4/1985 | Govang | A47F 5/0846 211/59.1 |
| 4,597,122 A | 7/1986 | Handler | |
| 4,750,794 A | 6/1988 | Vegh | |
| 4,752,150 A | 6/1988 | Salice | |
| 4,883,331 A | 11/1989 | Mengel | |
| 4,886,326 A | 12/1989 | Kuzyk | |
| 4,909,581 A | 3/1990 | Haheeb | |
| 5,114,265 A | 5/1992 | Grisley | |
| 5,209,556 A | 5/1993 | Anderson | |
| 5,475,960 A | 12/1995 | Lindal | |
| 5,499,886 A | 3/1996 | Short et al. | |
| 5,527,103 A | 6/1996 | Pittman | |
| 5,658,036 A | 8/1997 | Brokaw et al. | |
| 5,893,617 A | 4/1999 | Lee | |
| 5,950,389 A | 9/1999 | Porter | |
| 6,413,007 B1 | 7/2002 | Lambright | |
| 6,675,979 B2 | 1/2004 | Taylor | |
| 6,769,219 B2 | 8/2004 | Schwitte et al. | |
| 6,827,028 B1 | 12/2004 | Callaway | |
| 7,451,535 B2 | 11/2008 | Wells et al. | |
| 7,584,583 B2 | 9/2009 | Bergelin et al. | |
| 7,621,092 B2 | 11/2009 | Groeke et al. | |
| 7,641,414 B1 | 1/2010 | Joyce | |
| 7,721,503 B2 | 5/2010 | Pervan et al. | |
| 7,818,939 B2 | 10/2010 | Bearinger | |
| 7,998,549 B2 | 8/2011 | Susnjara | |
| 8,042,311 B2 | 10/2011 | Pervan | |
| 8,220,217 B2 | 7/2012 | Muehlebach | |
| 8,387,327 B2 | 3/2013 | Pervan | |
| 8,505,257 B2 | 8/2013 | Boo et al. | |
| 8,615,952 B2 | 12/2013 | Engström | |
| 8,764,137 B2 | 7/2014 | Fehre | |
| 8,887,468 B2 | 11/2014 | Håkansson et al. | |
| 9,175,703 B2 | 11/2015 | Maertens | |
| 9,290,948 B2 | 3/2016 | Cappelle et al. | |
| 9,375,085 B2 | 6/2016 | Derelöv | |
| 9,538,842 B2 | 1/2017 | Håkansson et al. | |
| 2002/0170258 A1 | 11/2002 | Schwitte et al. | |
| 2006/0101769 A1* | 5/2006 | Pervan | E04F 15/02 52/591.1 |
| 2006/0273085 A1 | 12/2006 | Casto | |
| 2007/0006543 A1 | 1/2007 | Engström | |
| 2008/0236088 A1 | 10/2008 | Hannig et al. | |
| 2010/0083603 A1 | 4/2010 | Goodwin | |
| 2010/0173122 A1 | 7/2010 | Susnjara | |
| 2010/0289389 A1 | 11/2010 | Crabtree, II | |
| 2011/0225921 A1 | 9/2011 | Schulte | |
| 2011/0225922 A1 | 9/2011 | Pervan et al. | |
| 2011/0280655 A1 | 11/2011 | Maertens et al. | |
| 2011/0283650 A1 | 11/2011 | Pervan et al. | |
| 2012/0027967 A1 | 2/2012 | Maertens et al. | |
| 2012/0073235 A1 | 3/2012 | Hannig | |
| 2012/0124932 A1 | 5/2012 | Schulte et al. | |
| 2012/0279161 A1* | 11/2012 | Hakansson | F16B 5/0614 52/588.1 |
| 2012/0286637 A1 | 11/2012 | Fehre | |
| 2013/0014463 A1 | 1/2013 | Pervan | |
| 2013/0048632 A1 | 2/2013 | Chen | |
| 2013/0071172 A1 | 3/2013 | Maertens et al. | |
| 2013/0081349 A1 | 4/2013 | Pervan | |
| 2013/0111845 A1 | 5/2013 | Pervan | |
| 2013/0170904 A1 | 7/2013 | Cappelle et al. | |
| 2013/0232905 A2 | 9/2013 | Pervan | |
| 2014/0055018 A1 | 2/2014 | Shein et al. | |
| 2014/0286701 A1 | 9/2014 | Sauer | |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2015/0230600 A1 | 8/2015 | Schulte | |
| 2015/0368896 A1 | 12/2015 | Schulte | |
| 2016/0000220 A1 | 1/2016 | Devos | |
| 2016/0007751 A1 | 1/2016 | Derelöv | |
| 2016/0145029 A1 | 5/2016 | Ranade et al. | |
| 2016/0174704 A1 | 6/2016 | Boo et al. | |
| 2016/0192775 A1 | 7/2016 | Andersson | |
| 2016/0270531 A1 | 9/2016 | Derelöv | |
| 2017/0079433 A1 | 3/2017 | Derelöv et al. | |
| 2017/0089379 A1 | 3/2017 | Pervan | |

FOREIGN PATENT DOCUMENTS

| | | |
|---|---|---|
| EP | 0 871 156 A2 | 10/1998 |
| EP | 1 048 423 A2 | 11/2000 |
| EP | 1 048 423 B9 | 5/2005 |
| EP | 1 671 562 A1 | 6/2006 |
| EP | 1 922 954 A1 | 5/2008 |
| EP | 1 922 954 B1 | 7/2009 |
| WO | WO 00/66856 A1 | 11/2000 |
| WO | WO 01/51733 A1 | 7/2001 |
| WO | WO 01/53628 A1 | 7/2001 |
| WO | WO 02/055809 A1 | 7/2002 |
| WO | WO 02/055810 A1 | 7/2002 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079845 A1 | 7/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |

(56) References Cited

FOREIGN PATENT DOCUMENTS

| WO | WO 2010/082171 A2 | 7/2010 |
|---|---|---|
| WO | WO 2010/087752 A1 | 8/2010 |
| WO | WO 2011/012104 A2 | 2/2011 |
| WO | WO 2011/012104 A3 | 2/2011 |
| WO | WO 2011/085710 A1 | 7/2011 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A2 | 12/2011 |
| WO | WO 2011/151758 A3 | 12/2011 |
| WO | WO 2012/154113 A1 | 11/2012 |
| WO | WO 2013/025163 A1 | 2/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/108114 A1 | 7/2014 |
| WO | WO 2015/038059 A1 | 3/2015 |
| WO | WO 2015/105449 A1 | 7/2015 |

OTHER PUBLICATIONS

Håkansson, Niclas, et al., U.S. Appl. No. 15/379,791 entitled "Mechanical Locking System for Building Panels," filed in the U.S. Patent and Trademark office on Dec. 15, 2016.

Derelöv, Peter, et al., U.S. Appl. No. 15/415,356 entitled "Panels Comprising a Mechanical Locking Device and an Assembled Product Comprising the Panels", filed in the U.S. Patent and Trademark Office on Jan. 25, 2017.

Fridlund, Magnus, U.S. Appl. No. 15/422,798 entitled "Set of Panels for an Assembled Product," filed in the U.S. Patent and Trademark Office on Feb. 2, 2017.

Fridlund, Magnus, U.S. Appl. No. 15/428,469 entitled "Element and Method for Providing Dismantling Groove," filed in the U.S. Patent and Trademark Office on Feb. 9, 2017.

Boo, Christian, U.S. Appl. No. 15/428,504 entitled "Set of Panel-Shaped Elements for a Composed Element," filed in the U.S. Patent and Trademark Office on Feb. 9, 2017.

Fridlund, Magnus, U.S. Appl. No. 15/432,190 entitled "Method for Forming a Panel," filed in the U.S. Patent and Trademark Office on Feb. 14, 2017.

Derelöv, Peter, et al., U.S. Appl. No. 15/271,622 entitled "Panels Comprising Mechanical Locking Device and an Assembled Product Comprising the Panels", filed in the U.S. Patent and Trademark Office on Sep. 21, 2016.

Pervan, Darko, U.S. Appl. No. 15/308,872 entitled "Mechanical Locking System for Building Panels," filed in the U.S. Patent and Trademark Office on Nov. 4, 2016.

Derelöv, Peter, U.S. Appl. No. 15/366,704 entitled "Panels Comprising a Mechanical Locking Device and an Assembled Product comprising the Panels", filed in the U.S. Patent and Trademark Office on Dec. 1, 2016.

* cited by examiner

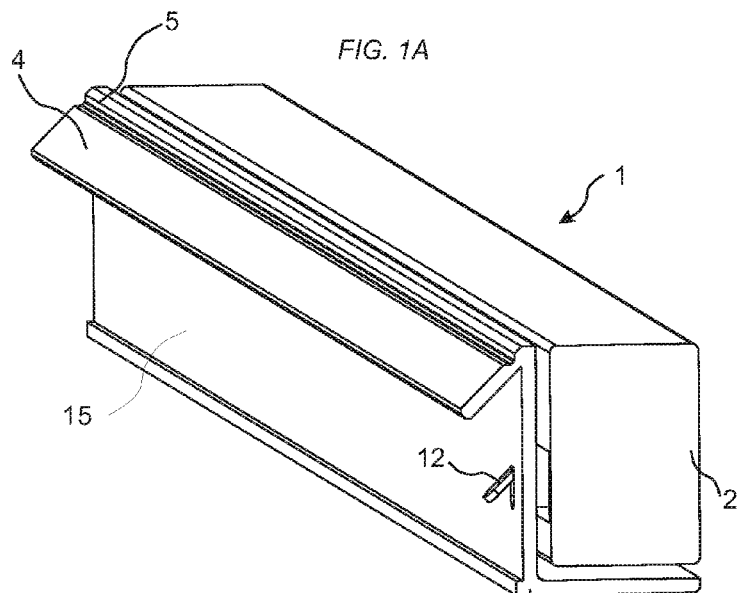
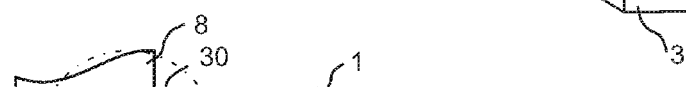
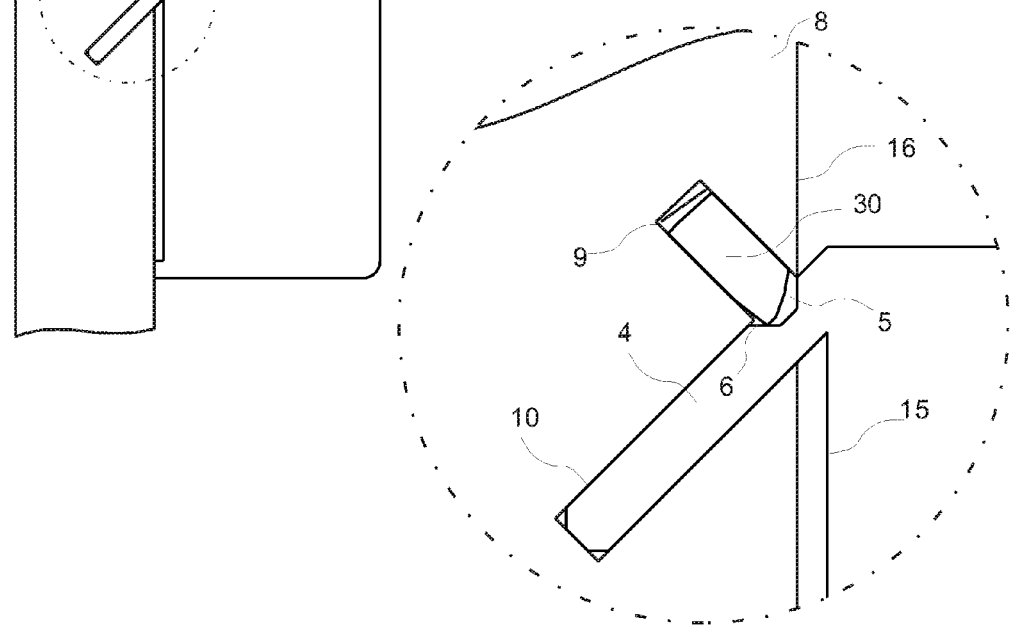

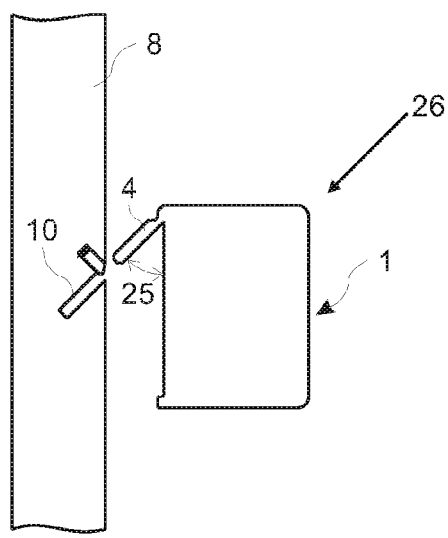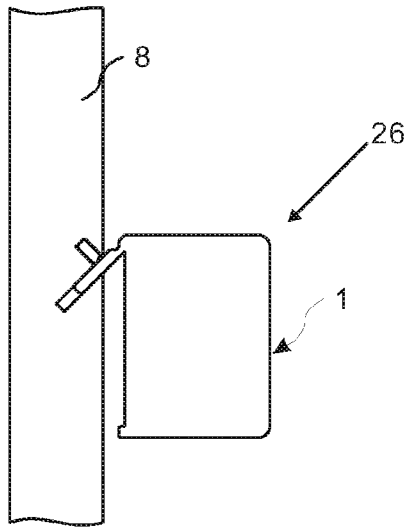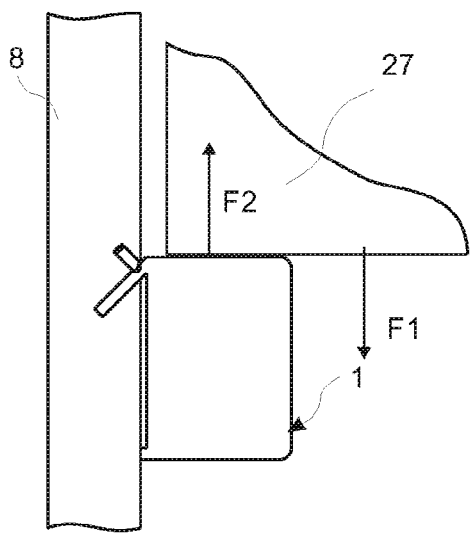

PANEL WITH A SLIDER

CROSS REFERENCE TO RELATED APPLICATIONS

The present application is a continuation of U.S. application Ser. No. 14/794,883, filed on Jul. 9, 2015, which claims the benefit of Swedish Application No. 1450891-5, filed on Jul. 11, 2014. The entire contents of U.S. application Ser. No. 14/794,883 and Swedish Application No. 1450891-5 are hereby incorporated herein by reference in their entirety.

TECHNICAL FIELD

The present disclosure relates to a fastening device for connecting a runner, such as a drawer runner to a panel, such as a building panel, a wall panel, furniture component or the like.

TECHNICAL BACKGROUND

Drawer sliders are known that are fixed to, e.g., furniture by screws. A drawback with the known systems is that it time consuming to assemble the sliders to the furniture.

The above description of various known aspects is the applicant's characterization of such, and is not an admission that any of the above description is considered as prior art.

SUMMARY

It is an object of certain embodiments of the present disclosure to provide an improvement over the above described techniques and known art. Particularly to reduce the time for assembling and the strength of the locking system is improved by embodiments of the disclosure.

At least some of these and other objects and advantages that will be apparent from the description have been achieved by a first aspect of the disclosure that comprises a set comprising a panel and a slider, such as a drawer slider. The slider comprises a first surface and the panel comprises a second surface. The slider is being configured to be assembled to the panel with the first surface facing the second surface. The second surface is provided with an insertion groove and a displacement groove, which are of a longitudinal shape. A first angle, which is between the second surface and the insertion groove, is an acute angle. A strip protrudes from the first surface and a second angle, which is between the strip and the first surface, is an acute angle. The strip is configured to be inserted into the insertion groove when the slider is assembled to the panel. A displaceable tongue is arranged in the displacement groove and a locking surface of the displaceable tongue is configured to cooperate with a locking surface of the strip for locking the strip to the panel.

The displaceable tongue may be pushed into the displacement groove, by the strip, during assembling of the slider to the panel and spring back to a position in which the locking surface of the displaceable tongue cooperates with the locking surface of the strip.

The panel may extend in a vertical direction and may be a part of a furniture. The strip and the acute angle may have the advantage that the slider may carry a great load when a load, e.g., from a drawer connected to the slider. The slider may comprise an inner part, which is assembled to the panel, and an outer part, which is connected to the drawer. The outer part is displaceable relative the inner part. When the drawer with a load is pulled out and the outer part is displaced relative the inner part a moment is created which may cause the strip to slide out from the insertion groove. The displaceable tongue is intended to prevent that strip slides out from the insertion groove.

A first plane, which is parallel to the depth direction of the insertion groove, may intersect a second plane, which is parallel to the depth direction of the displacement groove.

An opening of the displacement groove is preferably adjacent to an opening of the insertion groove.

The first and the second angle may be essentially the same and in the range of about 45° to about 60°.

A third angle, which is between the insertion groove and the displacement groove, may be in the range of about 60° to about 90°. An angle about 90° may provide an improved locking between the displaceable tongue and the strip.

A fourth angle, which is between the displacement groove and the second surface, may be in the range of about 45° to about 60°.

The locking surface of the strip may be arranged in a recess at an upper surface of the strip.

A locking element may protrudes from the first surface and the second surface may comprises a locking groove, preferably a hole, such as a drill hole, wherein the locking element is configured to cooperate with the locking groove for preventing the strip from being displaced along the insertion groove. The insertion groove may extend along essentially the entire panel and may have an opening at one or both side edges of the panel, e.g., at a backside of the panel. Without the locking element and the locking groove the slider may be displaced along and out of the insertion groove. The insertion groove may also be produced with mechanical cutting with rotating tools with an axis of orientation which is perpendicular to the insertion groove. Such a production may create a rounded surface at an end of the insertion groove. The rounded surface may guide the strip out of the insertion groove when a load is applied on the slider along the insertion groove, e.g., when a drawer which is attached to the slider is pulled out along the slider.

A fifth angle, which is between the first surface and the locking element, is preferably essentially the same as the second angle. A sixth angle, which is between the locking groove and the second surface, is preferably essentially the same as the fifth angle. These angles may provide and easy assembling by a displacement of the slider relative to the panel in a direction parallel to the second angle.

The strip may be provided with a friction connection, such as protruding parts, at an upper an/or lower surface, and/or at an outer edge, wherein the protruding parts are configured to cooperate with a surface of the insertion groove for preventing the strip from being displaced along the insertion groove. The friction connection may be an alternative to the locking element and the locking groove.

Slider may comprise parts comprising a metal, produced of, e.g., bent metal sheets. The slider may also comprise parts comprising a polymer, produced, e.g., by injection moulding.

The core of the panel may be a wood-based core, preferably made of MDF, HDF, OSB, WPC, plywood or particleboard. The core may also be a plastic core comprising thermosetting plastic or thermoplastic, e.g., vinyl, PVC, PU or PET. The plastic core may comprise fillers. The panel may be provided with a decorative layer, such as a foil or a veneer, on one or more surfaces. The panel may also be of solid wood.

The slider may, as an alternative, be a fixed carrying device for, e.g., a shelf or other furniture component.

BRIEF DESCRIPTION OF THE DRAWINGS

The present disclosure will by way of example be described in more detail with reference to the appended schematic drawings, which shows embodiments of the present disclosure.

FIGS. 1A-C show an embodiment of the disclosure.

FIGS. 2A-C show an embodiment of an assembling.

DETAILED DESCRIPTION

Figure 3A:
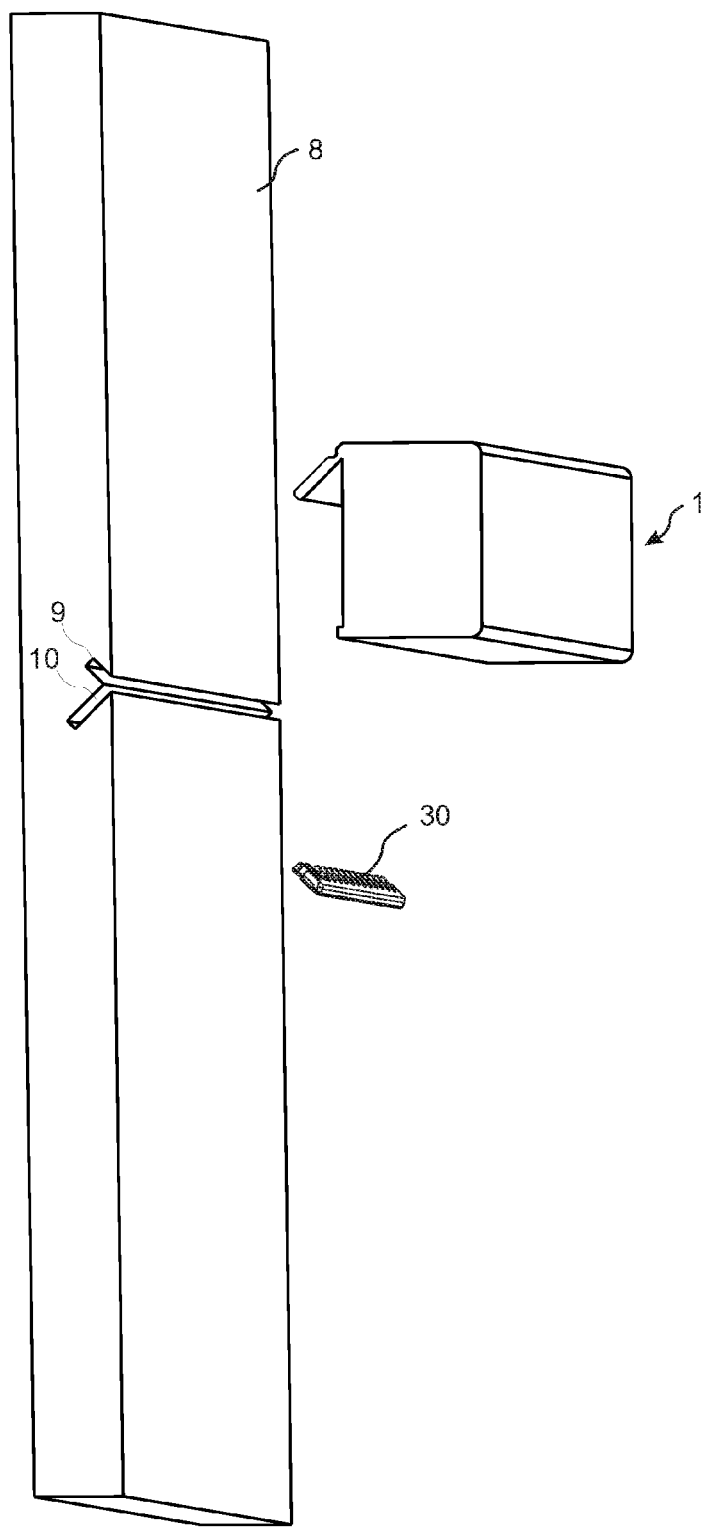
FIG. 3A shows a 3D-view of an embodiment of the disclosure before assembling.

An embodiment of the disclosure is shown in FIG. 1A-C. FIG. 1C shows an enlargement of the encircled area of FIG. 1B, which shows a schematic drawing of a panel 8 and a slider 1. The embodiments include a set, which may be a part of a furniture or kitchen furnishing, comprising a panel 8 and a slider 1, such as a drawer slider. The panel may be of a rectangular shape and arranged such that it extends in a vertical direction. The slider may comprise an inner part 3, which is assembled to the panel, and an outer part 2, which is configure to be connected to a drawer (not shown in the figures). The outer part may be displaceable relative the inner part. The slider comprises a first surface 15 and the panel comprising a second surface 16. The slider is configured to be assembled to the panel with the first surface 15 facing the second surface 16. The second surface 16 is provided with an insertion groove 10 and a displacement groove 9, which are of a longitudinal shape extending along the second surface 16. A first angle 20 (see FIG. 4B), which is between the second surface and the insertion groove, is an acute angle. A strip 4 protrudes from the first surface. A second angle 25 (see FIG. 2A), which is between the strip 4 and the first surface 15, is an acute angle. The strip is configured to be inserted into the insertion groove when the slider is assembled to the panel. A displaceable tongue 30 is arranged in the displacement groove 9. A locking surface 81 (see FIG. 8C) of the displaceable tongue is configured to cooperate with a locking surface 6 of the strip for locking the strip to the panel. The insertion groove and the displacement groove extend in a horizontal direction and may extend over essentially the entire panel.

The first surface 15 of the slider may comprise a locking element 12 and the second surface of the panel may comprise a locking groove 7 (see FIG. 4B), preferably a hole, such as a drill hole. The locking element is configured to cooperate with the locking groove for preventing the strip from being displaced along the insertion groove.

An upper surface of the strip 4 may comprise a recess 5 and the locking surface of the strip 6 may be arranged in the recess.

An opening of the displacement groove is arranged adjacent an opening of the insertion groove. A first plane, which is parallel to the depth direction of the insertion groove 10, intersects a second plane, which is parallel to the depth direction of the displacement groove 9.

Figure 5A:
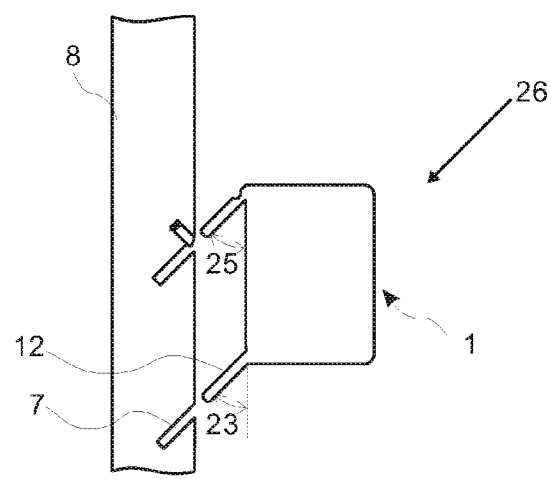
FIGS. 5A-C show an embodiment of an assembling.
Figure 5B:
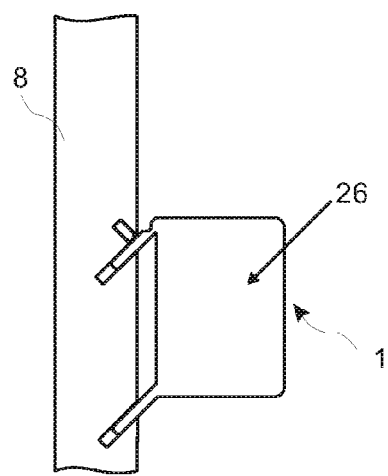
Figure 5C:
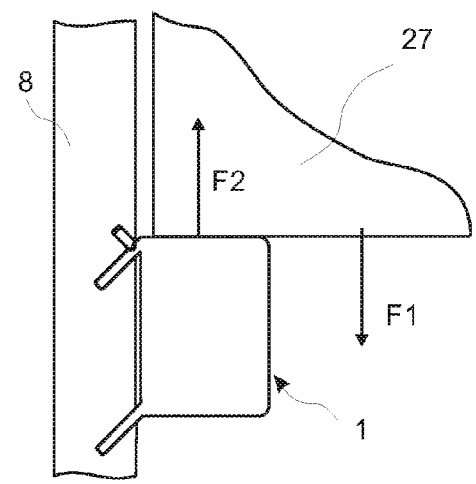

When the drawer 27, schematically shown in FIG. 2C and FIG. 5C, with a load F1 is pulled out and the outer part 2 is displaced relative the inner part 3 a moment is created with an upwardly directed moment force F2 on the inner part of the slider. The moment force F2 may cause the strip 4 to slide out from the insertion groove 10. The displaceable tongue 30 is intended to prevent the strip from sliding out from the insertion groove.

FIGS. 2A-C show an assembling of an embodiment of the slider 1 and the panel 8. The first angle 20 (see FIG. 4B) is the same as the second angle 25 and the slider 1 is displaced in a direction 26 which also has the same angle to the panel. The displaceable tongue is pushed towards a bottom of the displacement groove by the strip, as is shown in FIG. 2B. The displaceable tongue springs back when the slider has reached the locked position, in which the locking surface of the displaceable tongue cooperates with the locking surface of the strip, as is shown in FIG. 2C.

FIG. 3A shows a 3D-view of an embodiment of the panel with the displacement groove 9 and the insertion groove 10, the slider 1 and the displaceable tongue 30 before they are assembled. The embodiment comprises an embodiment of the displacement groove 9 and the insertion groove 10 that are open at a first and a second side edge of the panel 8.

Figure 4A:
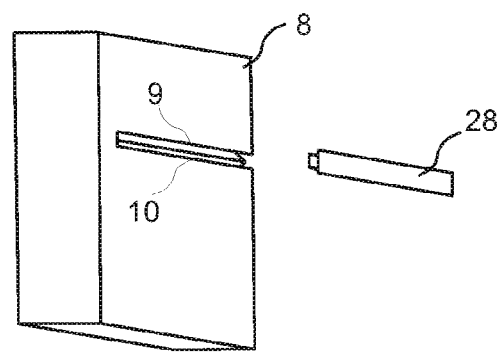
FIGS. 4A-B show an embodiment of a panel and parts of an embodiment of a locking system.

FIG. 4A shows an embodiment of the panel with a displacement groove 9 and an insertion groove 10, which are open at first side edge and end at a distance from a second side edge of the panel. The displacement groove 9 and an insertion groove 10 may also end at a distance from both the first and the second side edge. The first side edge is preferably a back side edge and the second edge a front side edge of, e.g., a furniture. The panel 8 may be provided with several displacement grooves 9 and an insertion grooves 10 and a groove that is not used for assembling of a slider may be covered with covering strip 28.

Figure 4B:
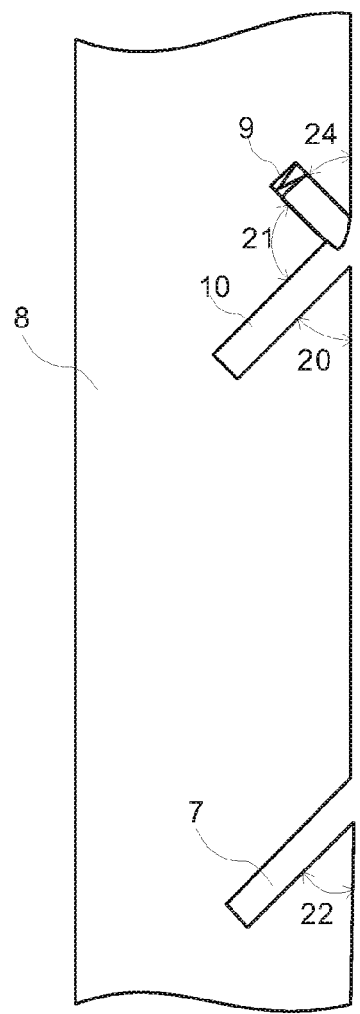

FIG. 4B shows an embodiment of the panel. The first angle 20, which is between the second surface of the panel 8 and the insertion groove 10, is 45°. A third angle 21, which is between the insertion groove and the displacement groove 9, is 90°. A fourth angle 24, which is between the displacement groove and the second surface, is 45°. A sixth angle 22, which is between the locking groove and the second surface, is 45°. Each of these angles may vary ±20° or ±10°.

FIGS. 5A-C show an assembling of an embodiment of the slider 1 and the panel 8. The slider comprises a locking element 12 that protrudes from the first surface 15 and the second surface of the panel comprises a locking groove 7. A fifth angle 23, which is between a plane of the first surface and the locking element, is preferably essentially the same as the second angle 25, wherein a sixth angle 22 (see FIG. 4B), which is between the locking groove and the second surface, is preferably essentially the same as the fifth angle 23. The first angle 20 is the same as the second angle 25 and the slider 1 is displaced in a direction 26 which also has the same angle to the panel. The displaceable tongue is pushed towards a bottom of the displacement groove by the strip, as is shown in FIG. 5B. The displaceable tongue springs back when the slider has reached the locked position, in which the locking surface of the displaceable tongue cooperates with the locking surface of the strip, as is shown in FIG. 5C.

Figure 6A:
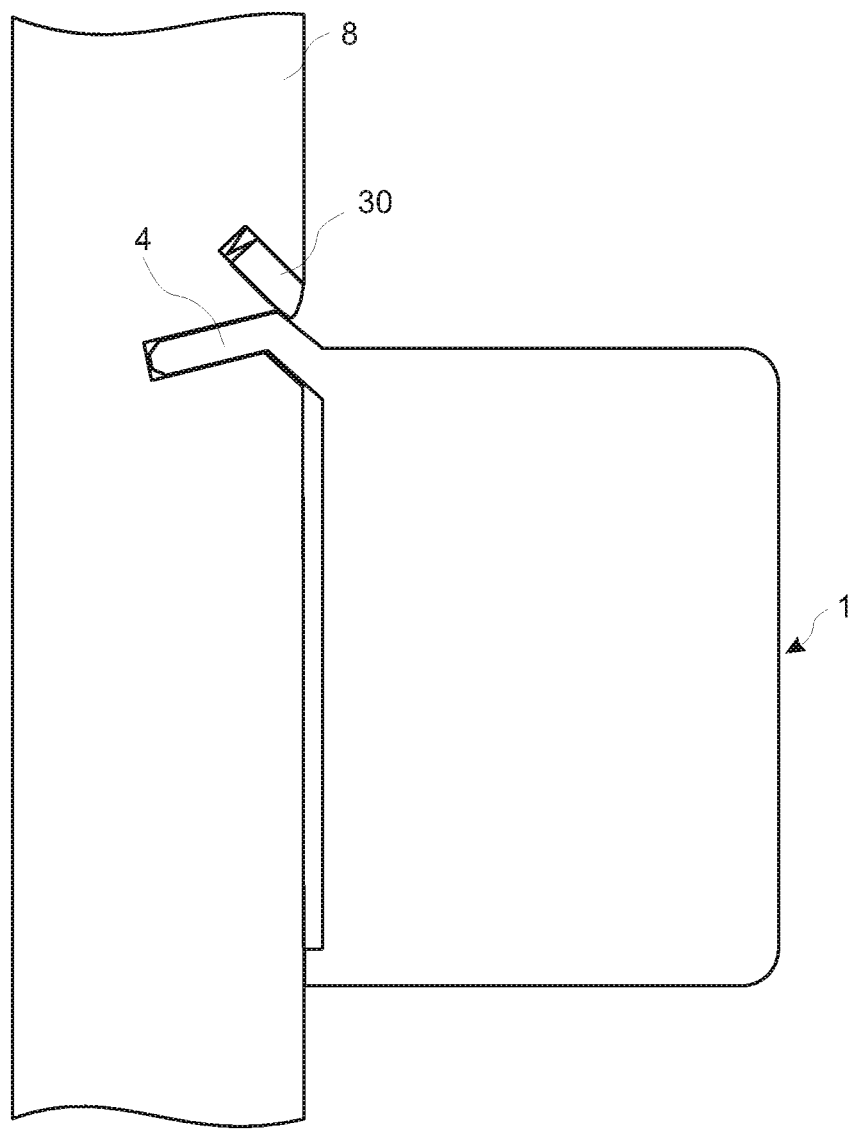
FIG. 6A shows an embodiment of the disclosure.

FIG. 6A shows an embodiment of the panel 8 and the slider 1 which comprises a V-shaped strip 4. The locking surface of the displaceable tongue 30 cooperates with a locking surface of the strip which is arranged at an upper surface of a strip. The V-shaped strip may be easier to produce, e.g., by bending the strip, since no recess for the locking surface of the strip has to be produced.

Figure 7A:
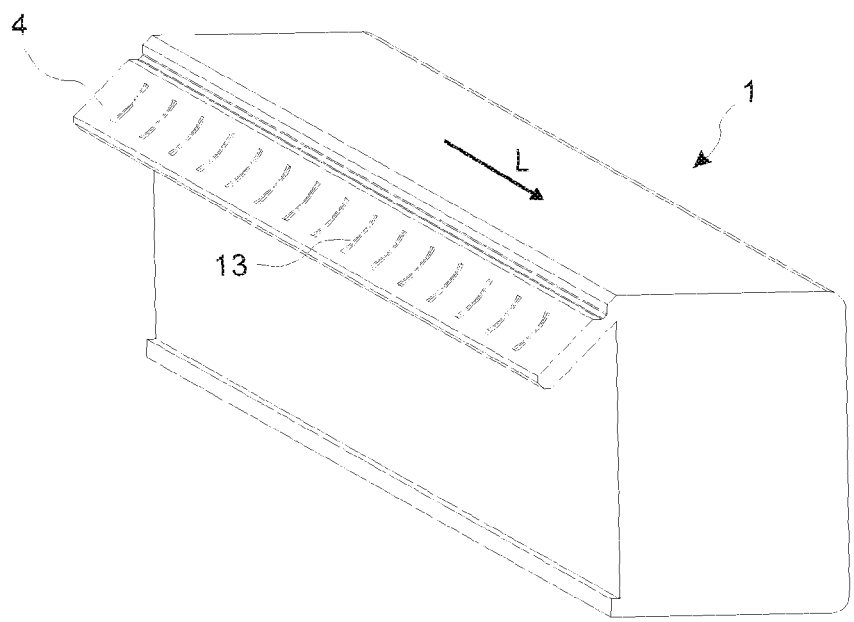
FIGS. 7A-B show an embodiment of parts of an embodiment of a locking system and a slider.
Figure 7B:
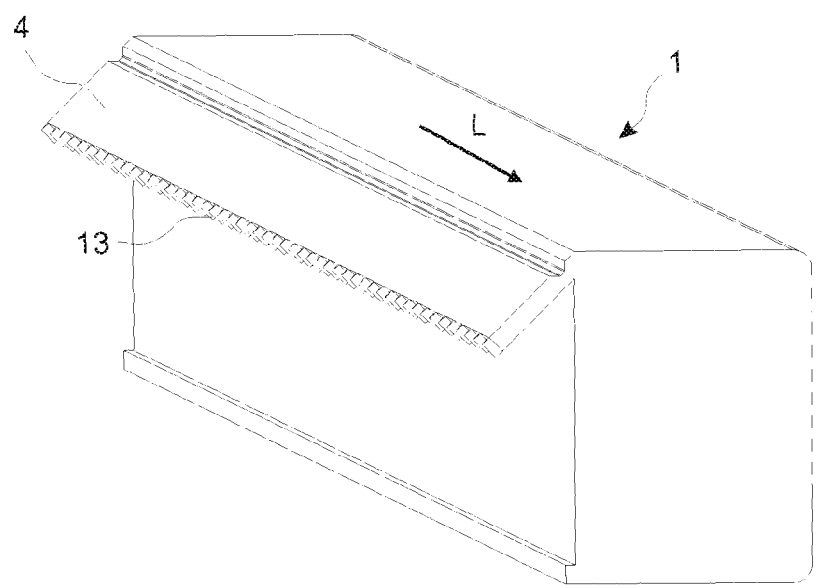

FIGS. 7A-B show embodiments of the slider 1, which comprises a friction connection at the strip 4. The friction connection cooperates with a surface of the insertion groove 10, for preventing the strip from being displaced along the insertion groove in a direction L parallel to a length direction of the slider. The friction connection may comprise protruding parts 13 at an upper and/or lower surface of the strip, and/or at an outer edge, wherein the protruding parts are configured to cooperate with a surface of the insertion groove.

The displaceable tongue may be configured as the displaceable tongue disclosed in, e.g., WO2006/043893 and WO2007/015669, the entire contents of which are hereby expressly incorporated by reference. The tongue may be a separate part and is made of, e.g., plastic and inserted in a displacement groove of a panel. Another embodiment of the displaceable tongue 30 is shown in FIGS. 8A-D. The displaceable tongue comprises several bendable parts 33. The bendable parts are provided with a lower and an upper friction connection 35 at a distance from the innermost part of the bendable part. The innermost part of the bendable parts 33 is provided with an upper and a lower bevel 39. The tongue is of a longitudinal shape and an outer edge of the displaceable tongue is preferably straight along essentially the whole longitudinal length of the displaceable tongue. An outer part 38 of the displaceable tongue is provided with a recess 31, which preferably extends along essentially the whole longitudinal length of the tongue. A locking surface 81 of the recess is configured to cooperate with a locking surface of the strip for locking strip to the insertion groove. A bevel 37 is provided at each end of the longitudinal edge, at a short edge of the displaceable tongue, to facilitate assembling of the slider and the panel by an angling movement. The tongue comprises a groove 34 at each bendable part 33. At least a part of the bendable part 33 is pushed into the groove 34 during assembling.

The recess 31 may comprise a second recess surface 85, which is arranged at an obtuse angle to the first recess surface 81. An angle between an upper surface of the displaceable tongue and the first recess surface 81 may be in the range of about 5° to about 15°, preferably in the range of about 7° to about 8°.

Figure 8A:
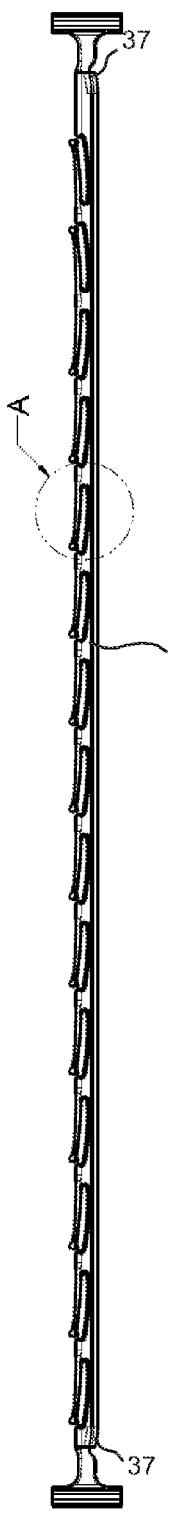
FIGS. 8A-D show a displaceable tongue according to an embodiment of the disclosure.
Figure 8B:
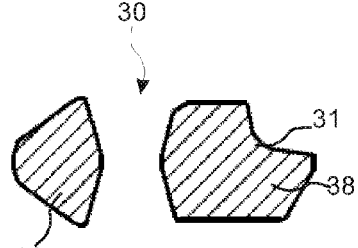

The displaceable tongue is preferably produced by injection moulding and FIG. 8A shows casting gates at the short edges of the displaceable tongue.

Figure 8C:
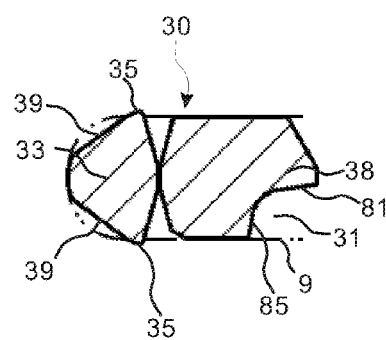
Figure 8D:
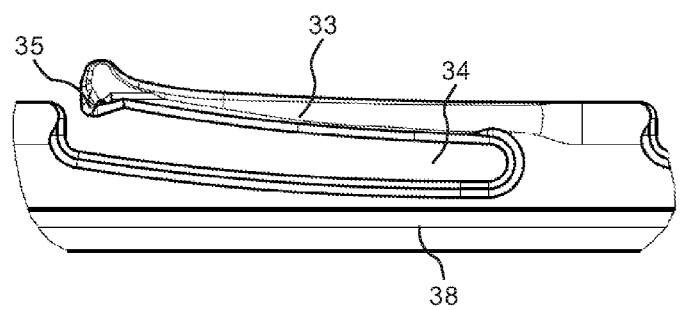

FIG. 8C shows displaceable tongue 30 arranged in the displacement groove 9 in a position during an assembling when the tongue is pushed into the displacement groove. The displacement groove 9 comprises an upper wall, a lower wall and an inner wall extending between the lower and the upper wall. The inner wall may be of a rounded shape. The inner wall may as an alternative comprise a plane section provided with a round section adjacent to the upper and/or lower wall. The upper friction connection is configured to cooperate with a plane section of the upper wall. The lower friction connection is configured to cooperate with a plane section of the lower wall. An upper surface of the displaceable tongue may be configured to be displaced along the upper wall during assembling of the slider and the panel. A lower surface of the displaceable tongue may be configured to be displaced along the lower wall during assembling of the slider and the panel.

Figure 9A:
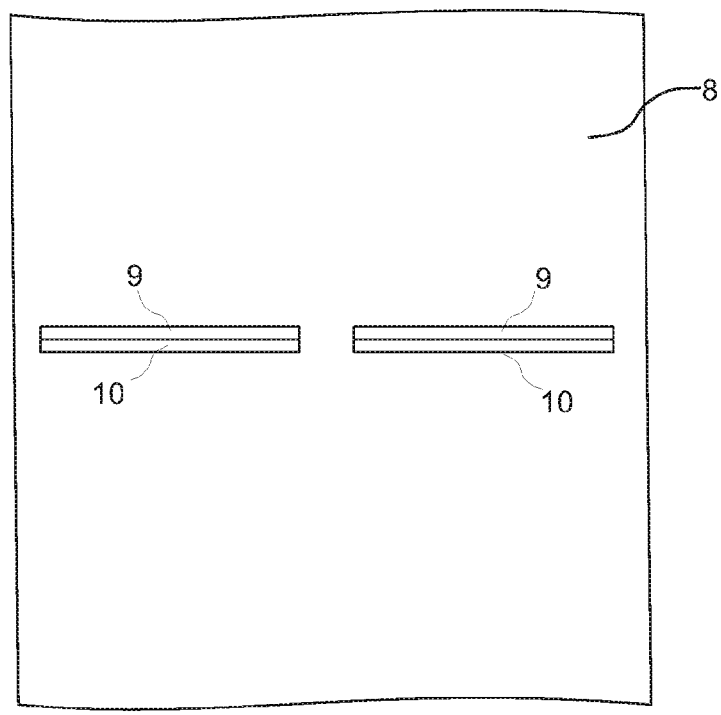
FIGS. 9A-B show an embodiment of parts of an embodiment of a locking system and a slider.
Figure 9B:
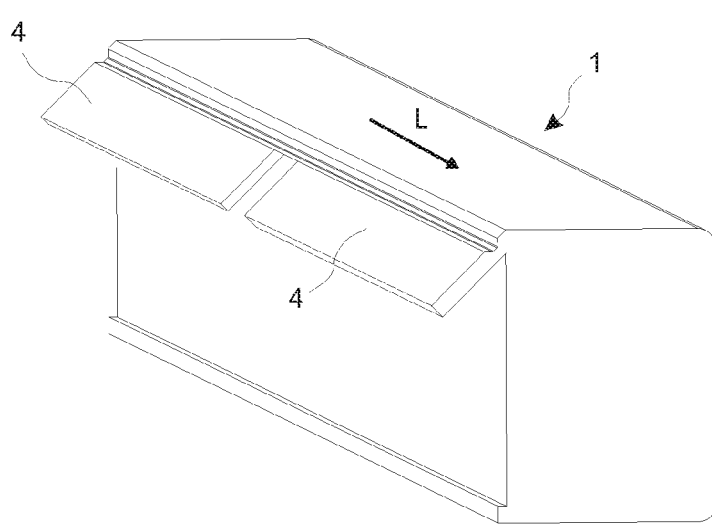

The slider may comprise two or more of said strip 4 along a length direction L of the slider, and the panel 8 may comprise two or more of said insertion groove 10 and two or more of said displacement groove 9. The number of insertion grooves preferably corresponds to or is greater than the number of strips. FIG. 9A shows an embodiment of the panel 8 that comprises two of said insertion groove 10 and two of said displacement groove. FIG. 9B shows an embodiment of slider which comprises two of said strip and is configured to be assembled to the panel shown in FIG. 9A.

The invention claimed is:

1. A set comprising a panel and a fixed carrying device for a furniture component, the fixed carrying device comprising a first surface and the panel comprising a second surface, the fixed carrying device is configured to be assembled to the panel with the first surface facing the second surface,
   wherein the second surface is provided with an insertion groove and a displacement groove, which are of a longitudinal shape,
   wherein a first angle, which is between the second surface and the insertion groove, is an acute angle,
   wherein a strip protrudes from the first surface,
   wherein a second angle, which is between the strip and the first surface, is an acute angle,
   wherein the strip is configured to be inserted into the insertion groove when the fixed carrying device is assembled to the panel,
   wherein a displaceable tongue is arranged in the displacement groove,
   wherein a locking surface of the displaceable tongue is configured to cooperate with a locking surface of the strip for locking the strip to the panel.

2. The set as claimed in claim 1, wherein a first plane, which is parallel to the depth direction of the insertion groove, intersects a second plane, which is parallel to the depth direction of the displacement groove.

3. The set as claimed in claim 1, wherein an opening of the displacement groove is adjacent an opening of the insertion groove.

4. The set as claimed in claim 1, wherein the first angle and the second angle are essentially the same and in the range of about 45° to about 60°.

5. The set as claimed in claim 1, wherein a third angle, which is between the insertion groove and the displacement groove, is in the range of about 60° to about 90°.

6. The set as claimed in claim 1, wherein a third angle, which is between the insertion groove and the displacement groove, is about 90°.

7. The set as claimed in claim 1, wherein a fourth angle, which is between the displacement groove and the second surface, is in the range of about 45° to about 60°.

8. The set as claimed in claim 1, wherein the locking surface of the strip is arranged in a recess at an upper surface of the strip.

9. The set as claimed in claim 1, wherein an locking element protrudes from the first surface and the second surface comprises a locking groove, wherein the locking element is configured to cooperate with the locking groove for preventing the strip from being displaced along the insertion groove.

10. The set as claimed in claim 9, wherein the locking groove is a hole.

11. The set as claimed in claim 9, wherein a fifth angle, which is between a plane of the first surface and the locking element, is essentially the same as the second angle, wherein a sixth angle, which is between the locking groove and the second surface, is essentially the same as the fifth angle.

12. The set as claimed in claim 1, wherein the strip is provided with protruding parts at at least one of an upper surface, a lower surface, and an outer edge, wherein the protruding parts are configured to cooperate with a surface of the insertion groove for preventing the strip from being displaced along the insertion groove.

13. The set as claimed in claim 1, wherein the furniture component is a shelf.

* * * * *